Patented Dec. 2, 1947

2,431,878

UNITED STATES PATENT OFFICE 2,431,878

TREATING DIMETHYL SILICONE POLYMER WITH BORIC OXIDE

Rob Roy McGregor, Verona, and Earl Leathen Warrick, Pittsburgh, Pa., assignors to Corning Glass Works, Corning, N. Y., a corporation of New York No Drawing. Application March 30, 1943, Serial No. 481,144

6 Claims. (Cl. 260—46.5)

This invention relates to new compositions of matter, their preparation and uses, and, more particularly, to organo-silicon polymers and methods of preparing them.

The present invention is concerned with a method of further polymerizing organo-silicon oxide polymers and with the products derived therefrom. Organo-silicon oxide polymers are compounds which contain organic radicals attached to silicon through a carbon atom and whose silicon atoms are joined to other silicon atoms by oxygen atoms, thus Si—O—Si. They may be prepared by the hydrolysis of hydrolyzable organo-silicanes and condensation of the hydrolysis products. Furthermore, hydrolysis of a mixture of different hydrolyzable organo-silicanes and co-condensation of the hydrolysis products produces organo-silicon oxide copolymers which are within the scope of our invention. In the latter case, a hydrolyzable silicane which contains no organic radicals attached to silicon through a carbon atom, such as silicon tetrachloride or ethyl orthosilicate, may be included along with the hydrolyzable organo-silicanes. By hydrolyzable organo-silicanes we mean derivatives of $SiH_4$ which contain readily hydrolyzable radicals such as hydrogen, halogens, amino groups, alkoxy, aroxy and acyloxy radicals, etc., the remaining valences of the silicon atoms being satisfied by organic radicals that are joined to the silicon atoms through carbon atoms such as alkyl, substituted alkyl, aryl, substituted aryl radicals, etc.

Hydrolysis of the above silicanes or mixtures thereof is generally accompanied by condensation to a greater or less degree depending upon the conditions of hydrolysis and the particular silicanes involved. As a result of the hydrolysis and concurrent condensation, organo-silicon oxide polymers or organo-siloxanes (as they are now commonly called) are produced which are partially or completely condensed and which have on the average up to and including three organic radicals attached to each silicon atom. The polymers so obtained vary in character, some being oily liquids, others being crystalline solids or gels. They also vary in the ease with which they may be further polymerized by heat since they differ in the number of active functional groups retained as a result of incomplete hydrolysis and condensation. Those which are only partially condensed may be converted to higher polymers and even to solids by heat alone or even by standing at room temperature by virtue of the completion of condensation. On the other hand, those organo-siloxanes which approach complete condensation are extremely resistant to further polymerization by heat alone. These substantially completely condensed polymers are not limited to those which are of high molecular weight but may be polymers of low molecular weight as well. For example, the condensed hydrolysis products of the di-organo-silicanes are essentially completely condensed even in the low polymeric stages and exist generally in the trimeric form with polymers as high as the hexamer being reported in only rare instances. Since the higher polymers of these organo-silicon oxide compounds, and particularly the higher polymers of the substantially completely condensed compounds, have been found to possess properties which adapt them to many industrial applications as will be described below, it is highly desirable to provide a method of further polymerizing the organo-silicon oxide polymers to higher polymeric compositions, that is, to increase their average molecular weight.

The primary object of this invention is to provide a method of polymerizing the hydrolysis products of hydrolyzable organo-silicanes or mixtures thereof.

Another object of our invention is to provide a method of further polymerizing an organo-siloxane having on the average less than three organic radicals attached through carbon atoms to each silicon atom.

Another object of our invention is to provide a method of further polymerizing a substantially completely condensed liquid hydrolysis product of a silicane of the type $R_2SiX_2$, where each R is an organic radical which is joined to the silicon atom through a carbon atom and each X is a hydrolyzable atom or group.

Still another object of the present invention is to provide a method of polymerizing a substantially completely condensed liquid hydrolysis product of a mixture of silicanes comprising essentially a di-organo-substituted silicane to a polymeric composition which is substantially free of polymers having less than seven silicon atoms per molecule.

Another object of our invention is to prepare organo-silicones of high average molecular weight.

In accordance with our invention, we have provided a method of polymerizing organo-siloxanes having on the average less than three organic radicals attached to each silicon atom which comprises maintaining boric oxide in intimate and continuous contact with said polymers. If desired, the boric oxide may be added during the initial hydrolysis and condensation of the silicane or mixture of silicanes since we have found boric oxide to be an effective condensation agent as well as catalyst for promoting the rearrangement of Si—O—Si bonds. The amount of boric oxide employed and the optimum temperature for carrying out the polymerization are conditions which vary with the silicone being treated and also with the type of product desired. We prefer to use the boric oxide in an amount equal to about one to five per cent by weight of the compound treated. We also prefer, in general, to heat the mixture at a temperature between 100° C. and 250° C. but lower temperatures have been employed successfully. By our method organo siloxanes of high average molecular weight may be produced which possess unusual properties. Organo-siloxanes which would normally gel upon being heated have been polymerized with boric oxide to liquids having viscosities higher than 300,000 Saybolt seconds. Furthermore, when these highly viscous polymers are further polymerized to gelation, products are obtained which resemble natural rubber in their elasticity.

In general, any liquid or low molecular weight silicone having on the average less than three organic radicals attached through carbon atoms to each silicon atom may be polymerized by our method; that is, treatment in accordance with our method will result in an increase in average molecular weight. Our method is not generally applicable to those polymers having three organic radicals attached to each silicon atom, that is, the dimeric ethers, since the only way the latter can polymerize is by removal of groups. It is believed that polymerization of organo-siloxanes by means of boric oxide is due in part to its effect as an agent for promoting the dehydration of the partially condensed silicones and in part to its effect as a catalyst for promoting the rearrangement of Si—O—Si bonds.

Reference should be had to the following examples for a better understanding of our invention.

EXAMPLE 1

In our copending application, Serial No. 432,530, filed February 26, 1942, we described the preparation of high viscosity fluids by the treatment of low viscosity dimethyl silicones with boric oxide. A low viscosity liquid dimethyl silicone was prepared by hydrolyzing dimethyldiethoxysilicane in the following manner. Fifty per cent by volume of dimethyldiethoxysilicane was refluxed with twenty-five per cent by volume of concentrated hydrochloric acid and twenty-five per cent by volume of 95% alcohol. The reflux was stopped after one hour and the product was washed with water. Heating and stirring in a low pressure air stream served to dry and at the same time to remove some low polymers from the liquid. After drying, the liquid product had a viscosity of 212 Saybolt seconds at 30° C. It was then found that viscosities of the order of 300,000 or more Saybolt seconds at 30° C. were obtained by treating the liquid with a small amount of anhydrous boric oxide (about 1%–2% by weight) and agitating the liquid while heating it at about 250° C. in an atmosphere of $CO_2$. By this means the rise in viscosity is quite rapid and high values are attained in a relatively short time.

EXAMPLE 2

Dimethyldiethoxysilicane was stirred for 5 minutes with a half volume of 85% sulphuric acid. An oily liquid was formed which was washed twice with water and twice with acetone. Residual water and acetone were driven off at 100° C. The product was allowed to stand at room temperature for 7 days during which time it increased somewhat in viscosity. Six samples of 25 grams each were weighed out and varying amounts of boric oxide were stirred into them. There was a noticeable rise in viscosity within an hour, the rise being more apparent as the amount of boric oxide increased. About 5 grams of each were heated at 230° C. for 81 hours. These samples were rubbery in that they showed rebound when dropped, yet they had cold flow. After standing for 24 hours, they were rolled into balls. The amount of rebound from a 60 inch drop is shown for the several samples in the following table.

Table 1

| Per Cent $B_2O_3$ | Rebound, Inches |
|---|---|
| 0.0 | 0 |
| 0.5 | 31 |
| 1.0 | 34 |
| 2.0 | 39 |
| 5.0 | 43 |
| 10.0 | 44 |

EXAMPLE 3

To liquid dimethyl silicone having a viscosity of 20 Saybolt seconds there was added boric oxide equal to about 3% by weight of the silicone sample. After standing at room temperature for 5 days, a gummy precipitate appeared. The supernatant liquid was poured off. The precipitate was held at 230° C. for 19 hours. It then showed a rebound of 47 inches when dropped 60 inches.

EXAMPLE 4

A sample of dimethyl silicone which had been polymerized to a gel was held at 230° C. for several hours. It was then transferred to a distilling flask and heated at 230° C. in the presence of 15% by weight of boric oxide. About 40% of the mixture slowly distilled over as a water white oil. The residue in the flask had plastic cold flow at room temperature but was not liquid at 230° C. A ball of it showed a rebound of 53 inches for a 60 inch drop.

Besides the above examples, methyl siloxanes containing on the average from less than one up to but not including three methyl radicals per silicon atom have been polymerized by our method. Other examples of organo-silicon compounds which may be polymerized to high molecular weight compositions by treating with boric oxide are the hydrolysis products of methylethyl silicon dichloride, diethyl silicon dichloride, dipropyl silicon dichloride, diethyldiethoxysilicane, dibutyldiethoxysilicane, diamyl silicon dichloride, methyl silicon trichloride, ethyltriethoxysilicane, propyl silicon trichloride, phenyl silicon trichloride, phenylethyl silicon dichloride, phenylmethyldiethoxysilicane, diphenyl silicon dichloride, etc. In certain instances it has been found desirable to treat the hydrolysis product of mixtures of two or more of the above compounds in which case triorgano-substituted silicanes such as trimethylethoxysilicane, phenyldimethylethoxysilicane, etc. have sometimes been added.

The polymers prepared in accordance with our invention may be used in a variety of industrial applications. In the solid or semi-solid state, they may be used as electrically insulating coatings. In the liquid form, they may be used as hydraulic fluids, liquid insulating media, water proofing agents, etc. Their resistance to high temperature, electrical insulating properties, low freezing points and high boiling points adapt them to many diversified industrial applications.

We claim:

1. The method which comprises adding boric oxide to polymeric dimethyl silicone in the amount of 0.5 to 15 per cent of the weight of the silicone each of the silicon atoms of said silicone having two and only two methyl radicals attached thereto, and then treating said silicone with said boric oxide under polymerizing conditions at a temperature between 100° C. and 250° C. until an increase in average molecular weight of said silicone is effected.

2. The method which comprises adding boric oxide to polymeric dimethyl silicone in the amount of 0.5 to 15 per cent of the weight of the silicone each of the silicon atoms of said silicone having two and only two methyl radicals attached thereto, and then treating said silicone with said boric oxide under polymerizing conditions at a temperature between 100° C. and 250° C. until a coherent rubbery solid is produced.

3. The method which comprises adding boric oxide to polymeric dimethyl silicone in the amount of 1 to 5 per cent of the weight of the silicone each of the silicon atoms of said silicone having two and only two methyl radicals attached thereto, and then treating said silicone with said boric oxide under polymerizing conditions at a temperature between 100° C. and 250° C. until an increase in average molecular weight of said silicone is effected.

4. The method which comprises adding boric oxide to polymeric dimethyl silicone in the amount of 1 to 5 per cent of the weight of the silicone each of the silicon atoms of said silicone having two and only two methyl radicals attached thereto, and then treating said silicone with said boric oxide under polymerizing conditions at a temperature between 100° C. and 250° C. until a coherent rubbery solid is produced.

5. The method which comprises treating dimethyl diethoxy silane with water under hydrolyzing conditions to form a liquid polymeric dimethyl silicone in which each of the silicon atoms of said silicone have two and only two methyl radicals attached thereto, adding boric oxide to said silicone in the amount of 0.5 to 10 per cent of the said silicone with said boric oxide under polymerizing conditions at a temperature between 100° C. and 250° C. until an increase in viscosity is effected.

6. The method according to claim 5 wherein the treatment with boric oxide is carried out until a coherent rubbery solid is produced.

ROB ROY McGREGOR.
EARL LEATHEN WARRICK.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,371,068 | Rochow | Mar. 6, 1945 |
| 2,375,998 | McGregor et al. | May 15, 1945 |

OTHER REFERENCES

Thorpe's Dictionary of Applied Chemistry, 4th ed., 1938 (Longman's), vol. II, page 46, top of column 2.

Kipping, Proc. Royal Soc. (London), vol. A159, 1937, pages 139 and 143 to 145.